United States Patent
Chan et al.

(10) Patent No.: US 9,438,584 B2
(45) Date of Patent: Sep. 6, 2016

(54) PROVISIONING DRM CREDENTIALS ON A CLIENT DEVICE USING AN UPDATE SERVER

(71) Applicant: ARRIS Enterprises, Inc., Suwanee, GA (US)

(72) Inventors: Tat Keung Chan, San Diego, CA (US); Alexander Medvinsky, San Diego, CA (US); Paul Moroney, La Jolla, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/529,849

(22) Filed: Oct. 31, 2014

(65) Prior Publication Data

US 2015/0326563 A1   Nov. 12, 2015

Related U.S. Application Data (60) Provisional application No. 61/990,248, filed on May 8, 2014.

(51) Int. Cl.
| | |
|---|---|
| *H04L 29/06* | (2006.01) |
| *H04N 21/266* | (2011.01) |
| *H04N 21/6334* | (2011.01) |
| *G06F 21/10* | (2013.01) |
| *H04N 21/436* | (2011.01) |
| *H04N 21/4367* | (2011.01) |

(52) U.S. Cl.
CPC ........... *H04L 63/0823* (2013.01); *G06F 21/10* (2013.01); *H04L 63/0457* (2013.01); *H04L 63/062* (2013.01); *H04L 63/068* (2013.01); *H04N 21/26613* (2013.01); *H04N 21/4367* (2013.01); *H04N 21/43615* (2013.01); *H04N 21/6334* (2013.01)

(58) Field of Classification Search
CPC ........... H04L 63/0823; H04L 63/0457; H04L 63/068; H04L 63/062; H04N 21/6334; H04N 21/26613
USPC ....................................................... 713/172
See application file for complete search history.

(56) References Cited

U.S. PATENT DOCUMENTS

| | | | |
|---|---|---|---|
| 7,181,620 B1 | 2/2007 | Hur | |
| 2010/0185864 A1* | 7/2010 | Gerdes, Jr. ............ | H04L 9/3213 713/175 |
| 2012/0117632 A1 | 5/2012 | Curtis et al. | |
| 2015/0229477 A1* | 8/2015 | Blair ..................... | H04L 9/3213 713/156 |

OTHER PUBLICATIONS

PCT Search Report & Written Opinion, Re: Application No. PCT/US2015/028780, dated Aug. 10, 2015.

* cited by examiner

*Primary Examiner* — Mohammad W Reza
(74) *Attorney, Agent, or Firm* — Thomas A. Ward (57) ABSTRACT

A method of provisioning DRM credentials on a client device, comprising receiving DRM credentials at an update server from a key generation system, the DRM credentials having been encrypted by the key generation system, receiving a DRM credential request from a client device, the DRM credential request comprising a digital signature, a device class certificate, and an authorization token, authenticating the DRM credential request by validating the digital signature and the device class certificate, extracting and validating the authorization token, and providing the DRM credentials to the client device.

20 Claims, 4 Drawing Sheets

FIG. 5

PROVISIONING DRM CREDENTIALS ON A CLIENT DEVICE USING AN UPDATE SERVER

CLAIM OF PRIORITY

This Application claims priority under 35 U.S.C. §119(e) from earlier filed U.S. Provisional Application Ser. No. 61/990,248, filed May 8, 2014, which is incorporated by reference herein in its entirety.

TECHNICAL FIELD

The present disclosure relates to the field of media copy protection, particularly a system for provisioning client devices with digital rights management credentials using an update server.

BACKGROUND

Consumers have come to enjoy accessing media content on-demand on non-television devices, such as mobile phones or tablet computers, by streaming media content over the internet or downloading media content to the device. Consumers also enjoy watching television broadcasts, either in real time or through digital video recorders (DVRs) whereby broadcasts can be recorded and viewed at a later time.

However, it has only recently been common to merge the two media consumption models by allowing recorded content from one device to be streamed or downloaded to another device due to concerns about digital rights management. For instance, equipment such as cable boxes or DVRs have only recently allowed media content, either real time broadcasts or recorded content, to be streamed or downloaded to non-television devices. Although many consumers would enjoy the flexibility of being able to choose whether to watch a live or recorded television broadcast on a non-television device, such as if they are not at home but would still like to watch a particular program on their mobile phone while on the go, most cable boxes and DVRs encrypt their content or have other digital rights management schemes in place to prevent unauthorized copying or transfer of media content.

Some systems are under development that would allow copy-protected content from one device can be accessed with authorization on a secondary device, without allowing unrestricted copying of the media content. For example, Digital Transmission Content Protection over Internet Protocol (DTCP-IP) is a scheme that provides for copy protection of media content as it is moved from one device to another device over a data connection. In a DTCP-IP system, a consumer can record television content on a DVR, then stream that recorded content to a smartphone or other client device over a wireless internet connection while maintaining the content's copy protection and preventing unauthorized copying.

The DVR or other home media server can use DRM credentials, such as DTCP-IP certificates and/or keys, to protect outgoing media content, such that only client devices that have valid DRM credentials can play back the media content.

SUMMARY

What is needed is a system and method for provisioning client devices with new or updated DRM credentials after the client devices have been deployed in the field. The client devices can be authorized to communicate with an update server to request and retrieve the DRM credentials. The client device's request to the update server can include an authorization token received from a gateway device associated with the client device, such as a home media server on a subscriber's home network that is associated with the subscriber's mobile client device. In some embodiments, the authorization token can indicate that the user of the mobile client device is in the vicinity of a legitimate gateway device. In some embodiments and/or situations, the authorization token can reduce abuse and/or unauthorized copying or playback of media content. By way of a non-limiting example, an arbitrary remote mobile client device that downloads an application can be blocked from obtaining proper DRM credentials because it has not received the authorization token from the gateway device, and thus can be prevented from using that authorization token to download DRM credentials. In some cases the update server has a limited inventory of DRM credentials, and/or can have purchased its inventory of DRM credentials from a DRM credentials authority. The presence of the authorization token within a device's request to the update server can help ensure that only authorized devices with proper authorization tokens can obtain DRM credentials, thereby preventing unauthorized devices from downloading DRM credentials and/or remotely exhausting of the update server's inventory of DRM credentials. In situations where DRM credentials are purchased by a network operator and loaded into the update server' inventory, this can save financial resources.

In one embodiment, the present disclosure provides a method of provisioning DRM credentials on a client device, the method comprising receiving at an update server a set of DRM credentials from a key generation system, the DRM credentials having been encrypted by the key generation system using a cryptographic key, receiving a DRM credential request at the update server from a client device, the DRM credential request comprising a digital signature, a device class certificate, and an authorization token, wherein the authorization token comprises a signature field containing a signature generated from one or more other fields within the authorization token using a device private key associated with a device certificate held by a gateway device that issued the authorization token to the client device, authenticating the DRM credential request at the update server by validating the digital signature and the device class certificate, extracting and validating the authorization token from the DRM credential request at the update server after the DRM credential request has been validated, and providing the DRM credentials to the client device.

In another embodiment, the present disclosure provides a method of provisioning DRM credentials on a client device, the method comprising sending an authorization request from a client device to a gateway device associated with the client device and located within the same local network as the client device, receiving at the client device an authorization token from the gateway device in response to the authorization request, sending a DRM credential request from the client device to an update server, the DRM credential request comprising a digital signature, a device class certificate, and the authorization token, receiving at the client device DRM credentials from the update server if the update server validates the authorization token, decrypting the DRM credentials at the client device using a cryptographic key shared between the client device and a key generation system, wherein the key generation system used the cryptographic key to encrypt the DRM credentials prior to providing the DRM credentials to the update server, and installing the DRM credentials on the client device.

BRIEF DESCRIPTION OF THE DRAWINGS

Further details of the present invention are explained with the help of the attached drawings in which.

DETAILED DESCRIPTION

Figure 1:
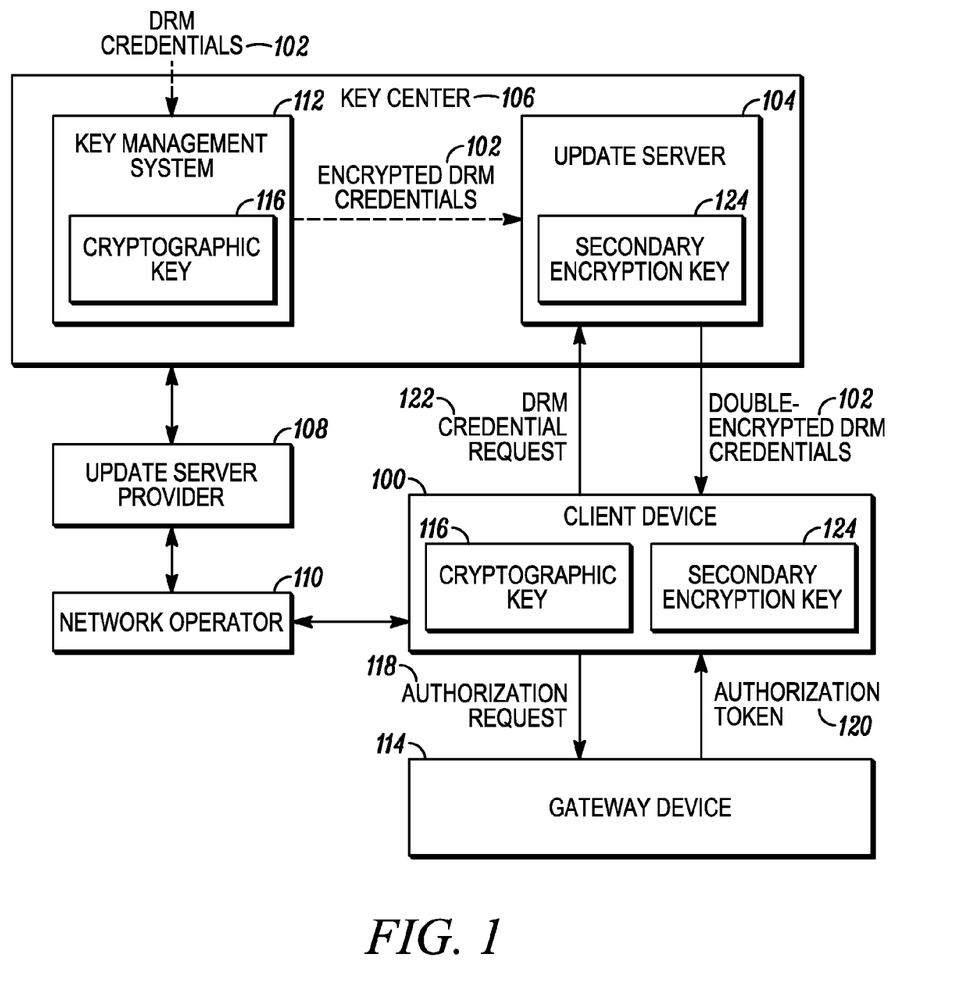
FIG. 1 depicts an exemplary operating environment for provisioning client devices with new or updated digital rights management credentials.

FIG. 1 depicts an exemplary operating environment for providing a client device 100 with digital rights management (DRM) credentials 102. A client device 100 can be a mobile phone, tablet computer, computer, television, gaming device, personal media device, set-top box, or any other device that can receive digital content over a network for playback and/or storage on the client device 100. The digital content can be media, files, and/or data such as video, audio, images, text, electronic books, games, and/or any other type of data. The digital content received by the client device 100 can be encrypted and/or copy protected using a DRM scheme, such that the client device 100 can only copy, render, display and/or otherwise access the digital content if it has the proper DRM credentials 102.

In some embodiments, the DRM credentials 102 can be Digital Transmission Content Protection over Internet Protocol (DTCP-IP) certificates and/or keys. DTCP-IP is a DRM scheme that provides for encryption and/or copy protection of digital content as it is moved from one device to another device over a data connection. By way of a non-limiting example, in a DTCP-IP system a home media server, such as a DVR, can record digital content, protect that digital content using a local storage encryption scheme, and then stream the DTCP-IP digital content to a client device 100 to maintain the digital content's copy protection during transmission and to help prevent unauthorized copying. In alternate embodiments, the DRM credentials 102 can be any other type of credentials for digital rights management schemes, such as PlayReady-ND or HDCP 2.2 credentials.

An Update Server 104 can be used to provide new or updated DRM credentials 102 to client devices 100. By way of a non-limiting example, in some situations the client devices 100 can have already been deployed to end users in the field, and can be provisioned with new or updated DRM credentials 102 post-deployment. The Update Server 104 and client device 100 can be configured to be in communication with one another over a data network when the client device 100 is to be provisioned with new or updated DRM credentials 102. In some embodiments a network operator 110 and/or Update Server Provider 108 can facilitate a connection between the Update Server 104 and client device 100 when the network operator 110 or Update Server Provider 108 desires that the client device 100 be provisioned with DRM credentials 102 from the Update Server 104.

In some embodiments, the Update Server 104 can be a server located at a Key Center 106. The Key Center 106 can be a facility operated by the manufacturer of the client device 100, an Update Server Provider 108, a network operator 110, or any other entity. In alternate embodiments, the Update Server 104 can be located at any other desired location. An Update Server Provider 108 can operate and/or be in communication with the Key Center 106, and can manage the provisioning of DRM credentials on client devices 100. The Update Server Provider 108 can also be in communication with a network operator 110 that runs a network to which the client device 100 is connected.

The Update Server 104 can receive and store DRM credentials 102 that were encrypted by a Key Management System 112. The Update Server 104 can also encrypt the DRM credentials 102 with a second layer of encryption, as will be discussed below, before providing the DRM credentials 102 to a client device 100. In some embodiments, as shown in FIG. 1, the Key Management System 112 and Update Server 104 can be located in the same Key Center 106. In alternate embodiments, the Key Management System 112 and Update Server 104 can be located in different locations.

The Key Management System 112 can be configured to store and/or encrypt DRM credentials 102. In some embodiments, for security purposes or other reasons, the Key Management System 112 can be kept offline within the Key Center 106 or any other facility, such that it is not in networked communication with other devices. In these embodiments, data can be loaded onto or retrieved from the Key Management System 112 manually using removable media, such as USB flash drives, CD-ROMs, or any other offline data transfer mechanism. In alternate embodiments, the Key Management System 112 can be networked with other devices occasionally or permanently to transfer data.

A gateway device 114 can be can be a device within a location associated with the owner or holder of the client device 100. By way of a non-limiting example, a network operator 110 can associate a particular client device 100 with a particular subscriber of its services, and the gateway device 114 can be a device connected to a network at the subscriber's home. The gateway device 114 can be a home media server, video management system, digital video recorder (DVR), router, modem, cable box, streaming media server, and/or any other device.

Figure 2:
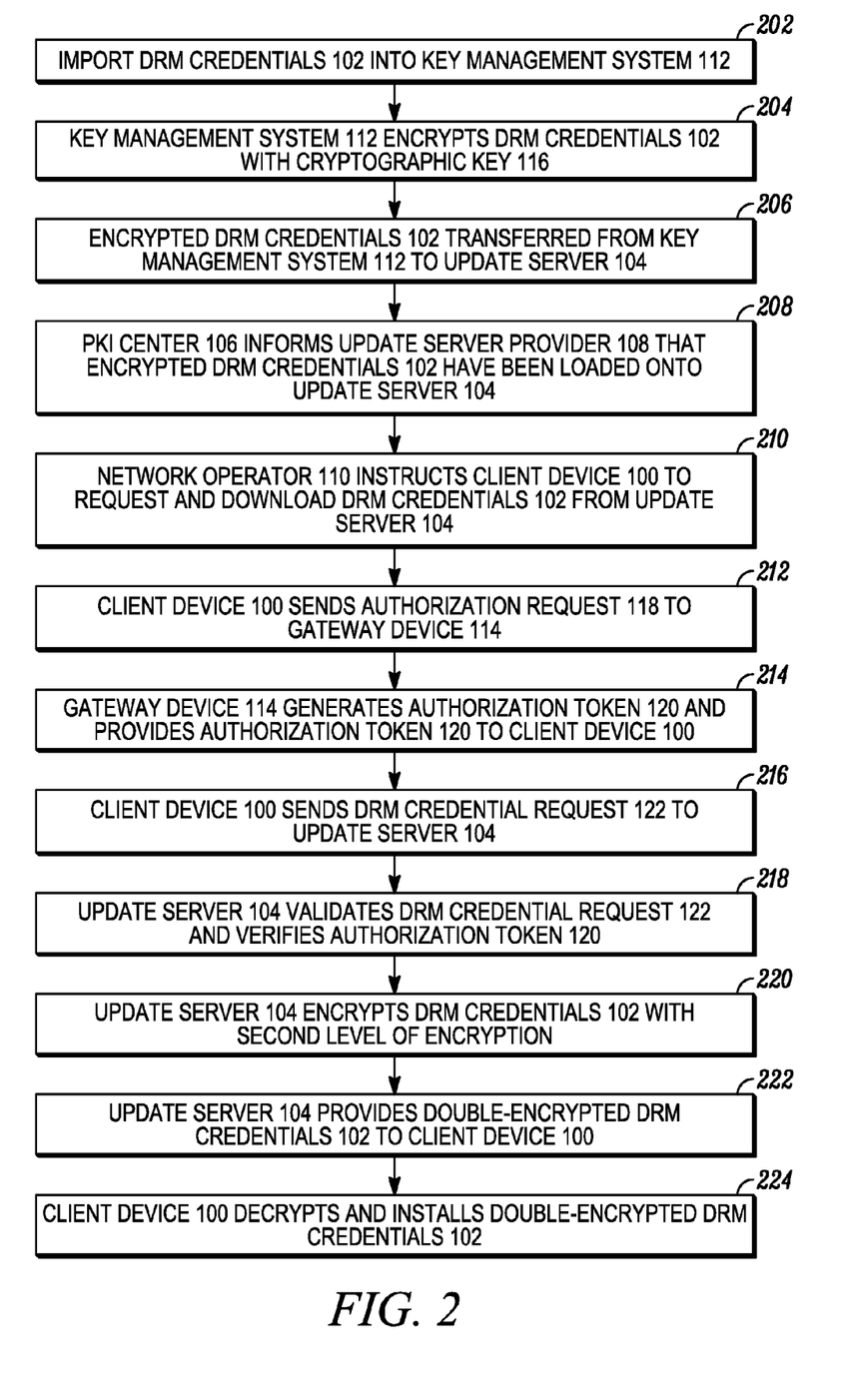
FIG. 2 depicts an exemplary method for provisioning a client device with new or updated digital rights management credentials.

FIG. 2 depicts an exemplary method for provisioning a client device 100 with new or updated DRM credentials 102 using an Update Server 104.

At step 202, DRM credentials 102 can be imported into the Key Management System 112 from another provider and/or device. By way of a non-limiting example, the DRM credentials 102 can be DTCP-IP certificates and/or keys provided by the Digital Transmission Licensing Administrator (DTLA), and can be manually be loaded onto an offline Key Management System 112 using physical media. Multiple sets of DRM credentials 102 can be loaded onto the Key Management System 112 for later use, as will be discussed below.

At step 204, the Key Management System 112 can encrypt each set of DRM credentials 102 using a cryptographic key 116. The cryptographic key 116 can be a bootstrap key, such as a global RSA key pair. In some embodiments the cryptographic key 116 can be loaded onto the Key Management System 112 from another component within the Key Center 106. In other embodiments, the cryptographic key 116 can be generated by the Key Management System 112.

The cryptographic key 116 can also be shared with the client device 100. In some embodiments, the cryptographic key 116 can be loaded onto the client device 100 in obfuscated form as part of a larger software client by an entity that loads software onto the client device 100, such as a manufacturer or a network operator 110 that installs software on the client device 100 at a factory or during a software update. In alternate embodiments, the Key Center 106 can share the cryptographic key 116 with a manufacturer or the network operator, which can separately load the cryptographic key 116 onto the client device 100 using software obfuscation tools. Software obfuscation tools typically include white-box cryptography, in which cryptographic algorithms such as RSA or AES (Advanced Encryption Standard) are implemented using a transformed version of the cryptographic key 116 using correspondingly transformed code. The code can be transformed or scrambled, such that the code logic becomes difficult to follow by only stepping through a debugger. The code can also detect when a debugger is running and prevent further execution. The code can be self-authenticated by verifying its own integrity by having portions of the code check a digital signature over other parts of the code. As described above, in some embodiments the cryptographic key 116 can be a global asymmetric key, such as an RSA key, that is obfuscated and combined with white box cryptography within a software client loaded onto the client device 100.

At step 206, the DRM credentials 102 encrypted by the Key Management System 112 can be transferred from the Key Management System 112 to the Update Server 104. As mentioned above, in some embodiments the Key Management System 112 can be offline, and the encrypted DRM credentials 102 can be manually transferred from the Key Management System 112 to the Update Server 104, such as by using flash drives or other removable media. In alternate embodiments the Key Management System 112 can be online, or can be temporarily brought online, and the encrypted DRM credentials 102 can be transferred from the Key Management System 112 to the Update Server 104 over a network.

At step 208, the Key Center 106 can inform the Update Server Provider 108 that encrypted DRM credentials 102 have been loaded onto the Update Server 104 and are ready to be downloaded to the client device 100. In some embodiments, the Update Server Provider 108 can then inform the network operator 110 that encrypted DRM credentials 102 are ready to be downloaded from the Update Server 104.

At step 210, the network operator 110 can instruct the client device 100 to request and download DRM credentials 102 from the Update Server 104. In some embodiments, the network operator 110 can install or update software on the client device 100 that allows the client device 100 to communicate with the Update Server 104 and/or receive the DRM credentials 102.

At step 212, the client device 100 can send an authorization request 118 to an associated gateway device 114. As discussed above, in some embodiments the gateway device 114 can be connected to a home network at the home of a subscriber associated with the client device 100, such as a home media server or video management system. In some embodiments, the connection between the client device 100 and the gateway device 114 can be a secure authenticated connection. By way of a non-limiting example, the connection between the client device 100 and the gateway device 114 can be authenticated in both directions using Transport Layer Security (TLS) and/or Secure Sockets Layer (SSL) certificates.

At step 214, the gateway device 114 can determine whether to grant the authorization request 118. If the authorization request 118 is granted, the gateway device 114 can generate an authorization token 120 and provide the authorization token 120 to the client device 100 in response to the client device's authorization request 118. If the authorization request 118 is not granted, the process can end.

In some embodiments, the gateway device 114 can check whether the authorization request 118 originated at a client device 100 associated with the gateway device 114. If it did not, such as if the client device 100 is associated with a different subscriber than the gateway device 114, the authorization request 118 can be denied. If it did, such as if both the client device 100 and gateway device 114 are associated with the same subscriber, the authorization request 118 can be granted.

In other embodiments, the gateway device 114 can check whether the authorization request 118 originated at a client device 100 within the home network or other local area network to which the gateway device 114 is connected. If it did not, such as if the client device 100 is in a location that is remote to the gateway device 114, the authorization request 118 can be denied. If it did, such as if the client device 100 is on the same local network as the gateway device 114, the authorization request 118 can be granted.

In alternate embodiments, communications between the client device 100 and gateway device 114 can pass through a home router on a home network or local network to which the gateway device 114 is connected, and the home router can be configured to block authorization requests 118 that originate from a remote connection. In these embodiments, any authorization requests 118 that are not blocked can be granted.

Figure 3:
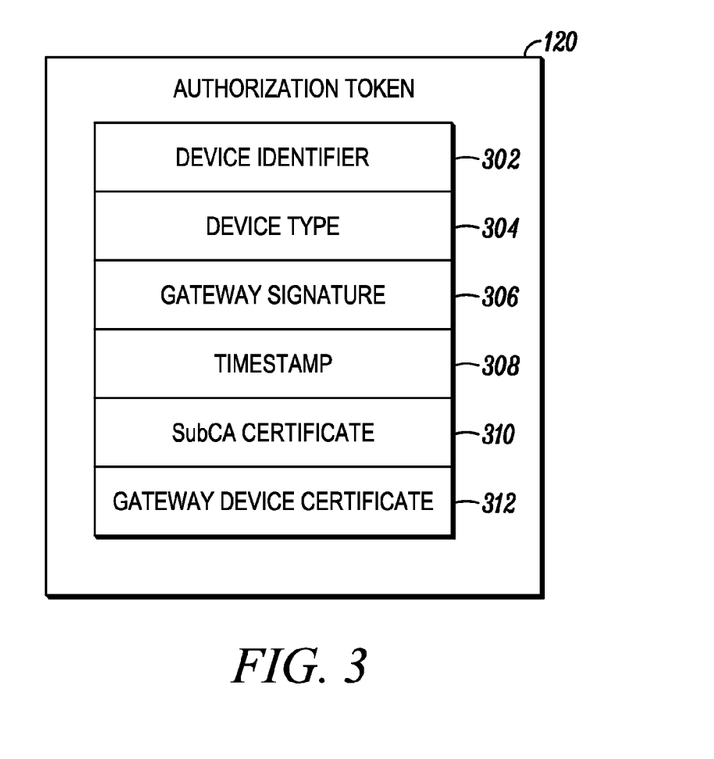
FIG. 3 depicts an exemplary format for an authorization token.

FIG. 3 depicts an exemplary format for the authorization token 120. The authorization token 120 can comprise a plurality of fields. Fields within the authorization token 120 can include fields for one or more of the following: a device identifier 302, a device type 304, a gateway signature 306, a timestamp 308, a SubCA certificate 310, and a gateway device certificate 312.

The device identifier 302 field can include a unique identifier that identifies the particular client device 100 that sent the authorization request 118. The device identifier 302 can be included by the client device 100 in its authorization request 118. The device identifier 302 can also be included in a DRM Credential Request 122 later sent by the client device 100 to the Update Server 104, and as described below in reference to FIG. 5 the Update Server 104 can later check that the device identifier 302 in the authorization token 120 matches the device identifier 302 in the DRM Credential Request 122.

The device type 304 field can indicate the type of client device 100 that sent the authorization request 118 to the gateway device 114. By way of non-limiting examples, the device type 304 field can hold an identifier indicating device types such as Apple® iOS devices, Android® devices, Apple® Macintosh computers, Linux computers, Windows® PCs, and any other type of device. As described below in reference to FIG. 4, in some embodiments the Update Server 104 can later check the device type 304 and block authorization requests 118 originating from device types it does not recognize or has not been set to trust.

The gateway signature 306 field can include a gateway signature 306 that covers some or all of the other fields within the authorization token 120 to validate that that the authorization token 120 came from the Gateway Device 114. By way of a non-limiting example, the signature algorithm can be a PKCS#1 v1.5 RSA with SHA-256 hash. The gateway signature 306 can be generated from the other portions of the authorization token 120 using a unique device private key held by the gateway device 114, cryptographically matching the gateway device certificate 312.

The timestamp 308 field can indicate the time that all or a portion of the authorization token 120 was generated. By way of a non-limiting example, in some embodiments the timestamp 308 can indicate the time at which the authorization token's gateway signature 306 was generated. As described below in reference to FIG. 4, in some embodiments the timestamp 308 can be later validated by the Update Server 104, and authorization tokens 120 that are too old can be rejected.

The SubCA certificate 310 field can include a digital certificate issued from a root certificate authority identifying a subordinate certification authority (SubCA) that issues the gateway device certificate 312, discussed below. By way of a non-limiting example, in some embodiments the SubCA certificate 310 can be a DER-encoded X.509 certificate.

The gateway device certificate 312 field can include a digital certificate issued to the gateway device 114 by an issuing entity. In some embodiments, the issuing entity can be the subordinate certification authority (SubCA) identified by the SubCA certificate 310. The gateway device certificate 312 can comprise information describing the issuing entity, a public key associated with the issuing entity, and a digital signature created by the issuing entity. As mentioned above, a gateway device private key associated with the gateway device certificate 312 can be used to generate the authorization token's gateway signature 306.

As described above, the authorization token 120 can be signed using a private key from the gateway device certificate 312. Portions of the authorization token 120 can describe a certificate chain indicating the relationships between certificate authorities that have issued certificates. By way of a non-limiting example, the embodiment shown in FIG. 3 includes a certificate chain that includes a SubCA certificate 310 issued by a root certificate authority and a Gateway Device Certificate 312 issued by a subordinate certificate authority. In alternate embodiments, the root certificate authority can issue the Gateway Device Certificate 312 directly, and the authorization token 120 can thus have a one-level certificate chain. In still other embodiments, the certificate chain can describe further levels of certificate authority relationships. By way of a non-limiting example, a root certificate authority can issue a certificate to a manufacturer SubCA, which can issue a certificate to a device model SubCA or location SubCA that issues the Gateway Device Certificate 312, and the authorization token 120 can have fields for each CA or SubCA in the chain.

Figure 4:
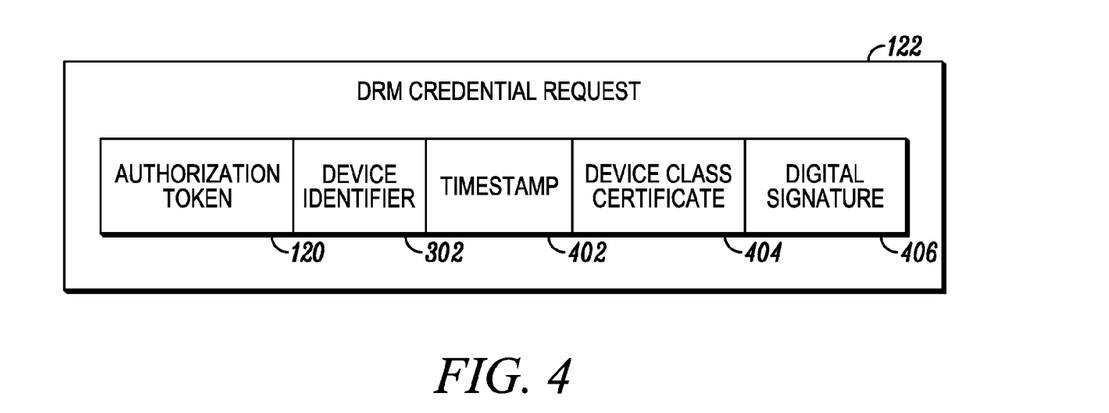
FIG. 4 depicts an exemplary format for a DRM Credential Request.

Returning to FIG. 2, at step 216, after the authorization request 118 has been granted and the client device 100 has received an authorization token 120 from the gateway device 114, the client device 100 can send a DRM Credential Request 122 to the Update Server 104. An exemplary embodiment of a DRM Credential Request 122 is shown in FIG. 4. The DRM Credential Request 122 can include a copy of the authorization token 120 issued to the client device 100 by the gateway device 114, the device identifier 302 associated with the client device 100 sending the DRM Credential Request 122, as well as a timestamp 402, a device class certificate 404, and a digital signature 406. The timestamp 402 in the DRM Credential Request 122 can indicate the time that the DRM Credential Request 122 was generated. In some embodiments, the device class certificate 404 in the DRM Credential Request 122 can be a device class certificate embedded in the client device's software. The device class certificate 404 can contain information about the device type and/or device class of the client device 100 sending the DRM Credential Request 122. In some embodiments, the digital signature 406 in the DRM Credential Request 122 can be generated using a device class private key that is obfuscated and embedded in the client device's software. In some embodiments, the DRM Credential Request 122 can further include an identifier of the network operator 110.

Figure 5:
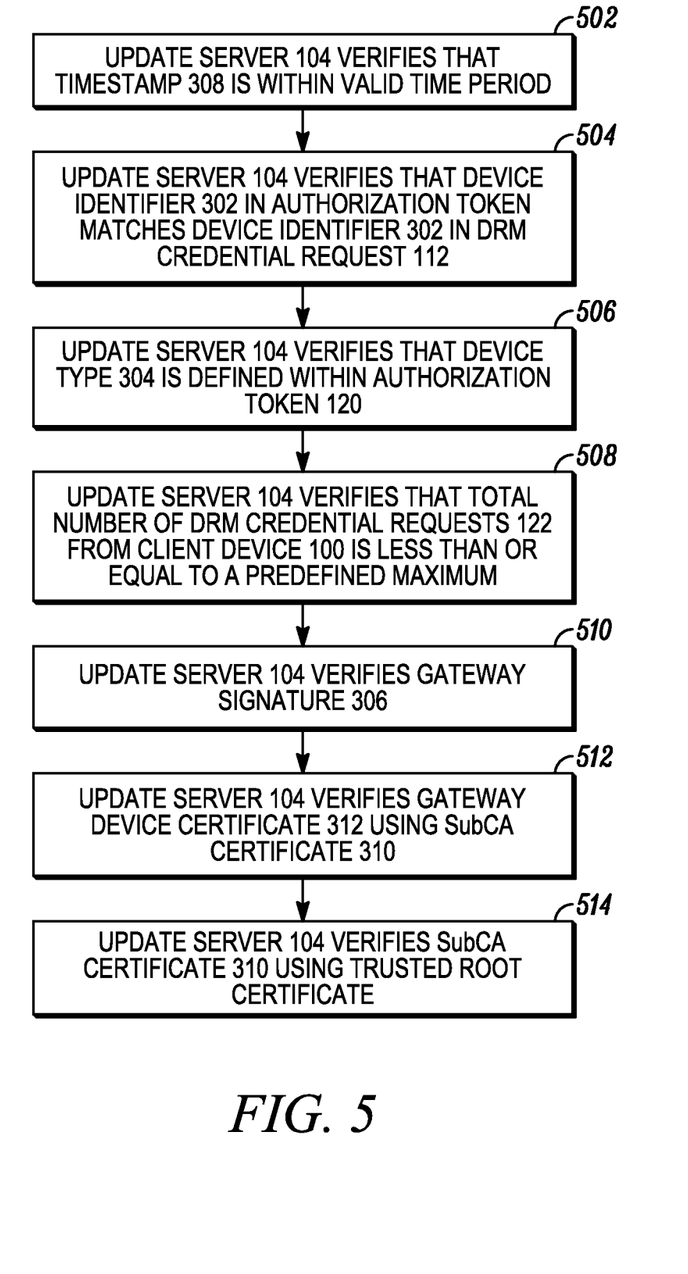
FIG. 5 depicts an exemplary method for verifying an authorization token.

At step 218, the Update Server 104 can authenticate the DRM Credential Request 122 received from the client device 100 by verifying the digital signature 406 and the device class certificate 404 sent as part of the DRM Credential Request 122. If the Update Server 104 authenticates the DRM Credential Request 122, the Update Server 104 can extract the authorization token 120 from the DRM Credential Request 122. The Update Server 104 can then validate the authorization token 120, such as through the process shown in FIG. 5. FIG. 5 depicts a non-limiting exemplary embodiment of a process for validating the authorization token 120. In alternate embodiments, the steps shown in FIG. 5 can be performed by the Update Server 104 in a different order and/or use fewer or more steps than shown in FIG. 5.

As shown in FIG. 5, at step 502 the Update Server 104 can verify that the authorization token's timestamp 308 is within a valid time period. By way of a non-limiting example, the Update Server 104 can verify that the timestamp 308 indicates a time within a predefined range relative to the current time. If the timestamp 308 is not within a valid time period, the authorization token 120 and DRM Credential Request 122 can be rejected. By way of a non-limiting example, in some embodiments the Update Server 104 can be set to reject any authorization tokens 120 that have a timestamp 308 more than three minutes in the past to help prevent replays of previously generated authorization tokens 120 and/or cut-and-past attacks in which an old authorization token 120 is illicitly copied into an authorization request 118 from an unauthorized client device 100. If the timestamp 308 is accepted by the Update Server 104, the Update Server 104 can move to step 504.

At step 504, the Update Server 104 can verify that the device identifier 302 in the authorization token 120 matches the device identifier 302 in the DRM Credential Request 122. If the device identifier 302 in the authorization token 120 does not match the device identifier 302 in the DRM Credential Request 122, the authorization token 120 and DRM Credential Request 122 can be rejected. By way of a non-limiting example, if the device identifier 302 in the authorization token 120 is different than the device identifier 302 in the DRM Credential Request 122, it can indicate an authorization token 120 was improperly copied onto an unauthorized client device 100 that should not be provisioned with DRM credentials 102. If the device identifier 302 in the authorization token 120 matches the one in the DRM Credential Request 122, the Update Server 104 can move to step 506.

At step 506, the Update Server 104 can verify that the device type 304 in the authorization token 120 is known to the Update Server 104 and matches the device type in the device class certificate 404. If the device type 304 is not recognized or does not match, the authorization token 120 and DRM Credential Request 122 can be rejected. By way of a non-limiting example, if the client device 100 presented an incorrect device type as part of its initial authorization request 118, it would receive an authorization token 120 from the gateway device 114 that has a device type 304 field that does not match the device type inside the device class certificate 404, and the Update Server 104 can reject the DRM Credential Request 122. If the device type 304 is known to the Update Server 104 and matches the one inside the device class certificate 404, the Update Server 104 can move to step 508.

At step 508, the Update Server 104 can verify that the total number of DRM Credential Requests 122 received from the requesting client device 100 is less than or equal to a predefined maximum. By way of a non-limiting example, a network operator 110, device manufacturer, or any other desired entity can predetermine that each client device 100 can submit up to a total number of DRM Credential Requests 122. If the number of DRM Credential Requests 122 received from the requesting client device 100 has exceeded the predefined maximum, the authorization token 120 and DRM Credential Request 122 can be rejected. If the number of DRM Credential Requests 122 received from the requesting client device 100 has not exceeded the predefined maximum, the Update Server 104 can move to step 510.

At step 510, the Update Server 104 can verify the authorization token's gateway signature 306 using the public key in the authorization token's gateway device certificate 312. If the Update Server 104 cannot verify the gateway signature 306, the authorization token 120 and DRM Credential Request 122 can be rejected. If the Update Server 104 verifies the gateway signature 306, the Update Server 104 can move to step 512.

At step 512, the Update Server 104 can verify the authorization token's gateway device certificate 312 using the SubCA certificate 310 in the authorization token 120. If the Update Server 104 does not verify the gateway device certificate 312, the authorization token 120 and DRM Credential Request 122 can be rejected. If the Update Server 104 verifies the gateway device certificate 312, the Update Server 104 can move to step 514.

At step 514, the Update Server 104 can verify the SubCA certificate 310 by using a trusted root certificate pre-installed on the Update Server 104. If the Update Server 104 does not verify the SubCA certificate 310, the authorization token 120 and DRM Credential Request 122 can be rejected. If the Update Server 104 verifies the SubCA certificate 310, the Update Server 104 can move to step 220 of FIG. 2.

Returning to FIG. 2, after the Update Server 104 has verified the authorization token 120, the Update Server 104 at step 220 can retrieve the next available set of encrypted DRM credentials 102 from its database. The DRM credentials 102 can have been previously encrypted with the cryptographic key 116 by the Key Generation System 112 during step 204, and can have been previously loaded onto the Update Server 104 from the Key Generation System 112 during step 206. The Update Server 104 can provide a second level of encryption to the DRM credentials 102 retrieved from its database by encrypting the DRM credentials 102 with a secondary encryption key 124, such as an Advanced Encryption Standard (AES) session key derived using a Diffie-Hellman key agreement between the Update Server 104 and the client device 100.

At step 222, the Update Server 104 can provide the double-encrypted DRM credentials 102 to the requesting client device 100 in response to the DRM Credential Request 122.

At step 224, the client device 100 can decrypt the double-encrypted DRM credentials 102 using the secondary encryption key 124 and the cryptographic key 116. The client device 100 can then validate and install the decrypted DRM credentials 102.

Once the client device has received, decrypted, and installed the DRM credentials 102, the client device 100 can use the DRM credentials 102 to copy, render, play, and/or otherwise access the digital content protected with an associated DRM scheme. By way of a non-limiting example, in some embodiments the gateway device 114 can be a home media server or DVR that records incoming television broadcasts, and then transfers that recorded digital content to the client device 100 for remote viewing. The gateway device 114 can protect its outgoing digital content with a DRM scheme, such as DTCP-IP, and the client device 100 can use DRM credentials 102, such as DTCP-IP keys and certificates, to play back the digital content.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of provisioning DRM credentials on a client device, comprising:
  receiving at an update server a set of DRM credentials from a key generation system, said DRM credentials having been encrypted by said key generation system using a cryptographic key;
  receiving a DRM credential request at said update server from a client device, said DRM credential request comprising a digital signature that includes two signature portions comprising: a device class certificate associated with a class of the requesting device, wherein the device class certificate signature portion is generated by the requesting client device and uses a private key; and an authorization token, wherein said authorization token signature portion comprises a signature field containing a signature generated from one or more other fields within the authorization token using a device private key associated with a device certificate held by a gateway device that generated and issued said authorization token to said client device;
  authenticating said DRM credential request at said update server by validating said digital signature;
  extracting and validating said authorization token from said DRM credential request at said update server after said DRM credential request has been validated; and
  providing said DRM credentials to said client device.

2. The method of claim 1, wherein said authorization token further comprises a timestamp field that indicates the time at which said signature was generated.

3. The method of claim 1, wherein said authorization token further comprises a device type field describing a device type associated with said client device.

4. The method of claim 1, wherein said DRM credentials are DTCP-IP certificates and keys.

5. The method of claim 1, wherein validating said authorization token at said update server comprises verifying said signature using a public key associated with said gateway device.

6. The method of claim 5, wherein validating said authorization token further comprises verifying that a device type field in said authorization token matches a device type in said device class certificate.

7. The method of claim 5, wherein validating said authorization token further comprises verifying that a total number of DRM credential requests received by said update server from said client device is less than or equal to a predefined maximum number of requests.

8. The method of claim 5, wherein validating said authorization token further comprises verifying that a timestamp in said authorization token is within a preset period of time from said update server's current time.

9. The method of claim 5, wherein validating said authorization token further comprises verifying that a device type in said authorization token is recognized by said update server.

10. The method of claim 1, wherein said authorization token further comprises a device identifier field describing a unique identifier associated with said client device.

11. The method of claim 10, wherein validating said authorization token further comprises verifying that the device identifier field in said authorization token matches a device identifier in said DRM credential request.

12. The method of claim 1, wherein said authorization token further comprises a certificate chain that includes a gateway device certificate issued to said gateway device by a subordinate certificate authority and a subordinate certificate authority certificate issued to said subordinate certificate authority by a root certificate authority.

13. The method of claim 1, further comprising encrypting said DRM credentials with a second level of encryption at said update server using a secondary encryption key shared between said update server and said client device.

14. The method of claim 13, wherein said secondary encryption key is generated based on a secure connection between said update server and said client device.

15. A method of provisioning DRM credentials on a client device, comprising:

sending an authorization request from a client device to a gateway device associated with said client device and located within the same local network as said client device;

receiving at said client device an authorization token from said gateway device in response to said authorization request;

sending a DRM credential request from said client device to an update server, said DRM credential request comprising a digital signature that includes two signature portions, a device class certificate associated with a class of the receiving update server device, wherein the device class certificate signature portion is generated by the receiving update server, and said authorization token, wherein the authorization token signature portion is generated by the gateway device that issued the authorization token to the client device;

receiving DRM credentials at said client device from said update server if said update server validates said authorization token;

decrypting said DRM credentials at said client device using a cryptographic key shared between said client device and a key generation system, wherein said key generation system used said cryptographic key to encrypt said DRM credentials prior to providing said DRM credentials to said update server; and installing said DRM credentials on said client device.

16. The method of claim 15, wherein said DRM credentials are DTCP-IP certificates and keys.

17. The method of claim 15, wherein said client device receives said cryptographic key in obfuscated form when software is installed on said client device by a network operator that allows said client device to communicate with said update server.

18. The method of claim 15, further comprising decrypting a secondary level of encryption from said DRM credentials at said client device using a secondary encryption key shared between said client device and said update server, wherein said update server used said secondary encryption key to encrypt said DRM credentials after receiving said DRM credentials from said key generation system.

19. The method of claim 15, wherein said client device and said gateway device are associated with the same subscriber to a network operator's services.

20. The method of claim 15, wherein said authorization token comprises a signature field containing a signature generated from one or more other fields within the authorization token using a device private key associated with a device certificate held by said gateway device.

* * * * *